US011775980B2

(12) United States Patent
Benkreira et al.

(10) Patent No.: US 11,775,980 B2
(45) Date of Patent: *Oct. 3, 2023

(54) UTILIZING A MACHINE LEARNING MODEL TO PERFORM ACTIONS BASED ON SELECTION OF A SINGLE SELECTION ABORT TRANSACTION MECHANISM

(71) Applicant: Capital One Services, LLC, McLean, VA (US)

(72) Inventors: Abdelkadar M'Hamed Benkreira, Washington, DC (US); Joshua Edwards, Philadelphia, PA (US); Max Miracolo, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 565 days.

This patent is subject to a terminal disclaimer.

(21) Appl. No.: 16/842,959

(22) Filed: Apr. 8, 2020

(65) Prior Publication Data

US 2020/0380517 A1 Dec. 3, 2020

Related U.S. Application Data

(63) Continuation of application No. 16/425,172, filed on May 29, 2019, now Pat. No. 10,628,829.

(51) Int. Cl.
*G06Q 20/40* (2012.01)
*G06N 20/00* (2019.01)
*G07F 19/00* (2006.01)

(52) U.S. Cl.
CPC .......... *G06Q 20/407* (2013.01); *G06N 20/00* (2019.01); *G06Q 20/4016* (2013.01); *G07F 19/207* (2013.01); *G07F 19/209* (2013.01)

(58) Field of Classification Search
CPC .. G06Q 20/407; G06Q 20/4016; G06N 20/00; G06N 3/08; G06N 20/10; G07F 19/207; G07F 19/209
See application file for complete search history.

(56) References Cited

U.S. PATENT DOCUMENTS

| 8,831,677 | B2 * | 9/2014 | Villa-Real | G07F 7/0886 |
| | | | | 455/552.1 |
| 9,589,256 | B1 * | 3/2017 | Thomas | G07F 19/206 |
| 9,652,640 | B1 * | 5/2017 | White | G06K 13/085 |

(Continued)

*Primary Examiner* — John W Hayes
*Assistant Examiner* — Yingying Zhou
(74) *Attorney, Agent, or Firm* — Harrity & Harrity, LLP

(57) ABSTRACT

A device receives, from a transaction device, transaction data associated with a transaction of a user logged into the transaction device, and receives information indicating a selection of an abort transaction mechanism to cause the transaction to be canceled concurrently with the user being logged out of the transaction device. The device provides, to a user device associated with the user, a notification indicating that the transaction was canceled and that the user was logged out, and determines whether a response, indicating that the notification was received by the user and indicating a reason for utilizing the abort transaction mechanism, is received from the user device within a threshold period of time. The device provides an alert message to an emergency point of contact for the user when it is determined that the response is not received from the user device within the threshold period of time.

20 Claims, 11 Drawing Sheets

(56) References Cited

U.S. PATENT DOCUMENTS

| | | | |
|---|---|---|---|
| 10,628,829 B1 | 4/2020 | Benkreira | |
| 2005/0035193 A1* | 2/2005 | Gustin | G06Q 20/1085 |
| | | | 235/379 |
| 2007/0250920 A1* | 10/2007 | Lindsay | G06F 21/31 |
| | | | 726/7 |
| 2009/0106148 A1* | 4/2009 | Prada | G06Q 20/40 |
| | | | 705/41 |
| 2011/0035240 A1* | 2/2011 | Joao | G06Q 40/08 |
| | | | 235/379 |
| 2014/0162598 A1 | 6/2014 | Villa-Real | |
| 2017/0177135 A1* | 6/2017 | Sarin | G06F 3/04847 |
| 2019/0020668 A1* | 1/2019 | Sadaghiani | H04L 63/1416 |
| 2019/0052661 A1* | 2/2019 | Anand | H04L 63/083 |
| 2019/0207953 A1* | 7/2019 | Klawe | G06Q 20/20 |

* cited by examiner

UTILIZING A MACHINE LEARNING MODEL TO PERFORM ACTIONS BASED ON SELECTION OF A SINGLE SELECTION ABORT TRANSACTION MECHANISM

RELATED APPLICATION

This application is a continuation of U.S. patent application Ser. No. 16/425,172, filed May 29, 2019 (now U.S. Pat. No. 10,628,829), which is incorporated herein by reference.

BACKGROUND

A transaction device may include an automated teller machine (ATM) device, a point of sale (POS) device, a kiosk device, and/or the like. A user of a transaction device may conduct a variety of transactions via the transaction device, such as receiving money, depositing money, checking an account balance, and/or the like.

SUMMARY

According to some implementations, a method may include receiving, from a transaction device, transaction data associated with a transaction of a user logged into the transaction device, where the transaction device may include an abort transaction mechanism that, when selected, enables the user to concurrently cancel the transaction and log out of the transaction device. The method may include receiving information indicating a selection of the abort transaction mechanism from the transaction device to cause the transaction to be canceled concurrently with the user being logged out of the transaction device. The method may include providing, to a user device associated with the user and based on receiving the information indicating the selection of the abort transaction mechanism, a notification indicating that the transaction was canceled and that the user was logged out of the transaction device, and determining whether a response, indicating that the notification was received by the user and indicating a reason for utilizing the abort transaction mechanism, is received from the user device within a threshold period of time. The method may include providing an alert message to an emergency point of contact for the user and/or to an emergency service when it is determined that the response is not received from the user device within the threshold period of time.

According to some implementations, a device may include one or more memories, and one or more processors, communicatively coupled to the one or more memories, to receive, from a transaction device, transaction data associated with a transaction of a user logged into the transaction device, where the transaction device may include an abort transaction mechanism that, when selected a single time, causes the transaction to be canceled and the user to be logged out of the transaction device. The one or more processors may receive information indicating a selection of the abort transaction mechanism from the transaction device to cause the transaction to be canceled and the user to be logged out of the transaction device, and may cause a camera at a location of the transaction device to be monitored based on receiving the information indicating the selection of the abort transaction mechanism. The one or more processors may provide, to a user device associated with the user, a notification indicating that the transaction was canceled and that the user was logged out of the transaction device, and may determine whether a response to the notification is received from the user device, where the response may be to indicate that the notification was received by the user and indicate a reason for utilizing the abort transaction mechanism. The one or more processors may selectively provide an alert message to an emergency point of contact for the user and/or to an emergency service based on whether the response to the notification is received from the user device. The alert message may be provided when the response is not received from the user device, or the alert message may not be provided when the response is received from the user device or when camera data from the camera indicates that the user is safe.

According to some implementations, a non-transitory computer-readable medium may store instructions that include one or more instructions that, when executed by one or more processors of a device, cause the one or more processors to receive, from a transaction device, transaction data associated with a transaction of a user logged into the transaction device, where the transaction device may include an abort transaction mechanism that, when selected, enables the user to cancel the transaction and log out of the transaction device at a same time. The one or more instructions may cause the one or more processors to receive information indicating a selection of the abort transaction mechanism from the transaction device to cause the transaction to be canceled and the user being logged out of the transaction device at the same time, and provide, to a user device associated with the user and based on receiving the information indicating the selection of the abort transaction mechanism, a notification indicating that the transaction was canceled and that the user was logged out of the transaction device. The one or more instructions may cause the one or more processors to determine whether a response to the notification is received from the user device within a threshold period of time, where the response may indicate that the notification was received by the user and may indicate a reason for utilizing the abort transaction mechanism. The one or more instructions may cause the one or more processors to selectively provide an alert message to an emergency point of contact for the user and/or to an emergency service based on whether the response to the notification is received from the user device within the threshold period of time. The alert message may be provided when the response is not received from the user device, or the alert message may not be provided when the response is received from the user device.

DETAILED DESCRIPTION

Figure 1A:
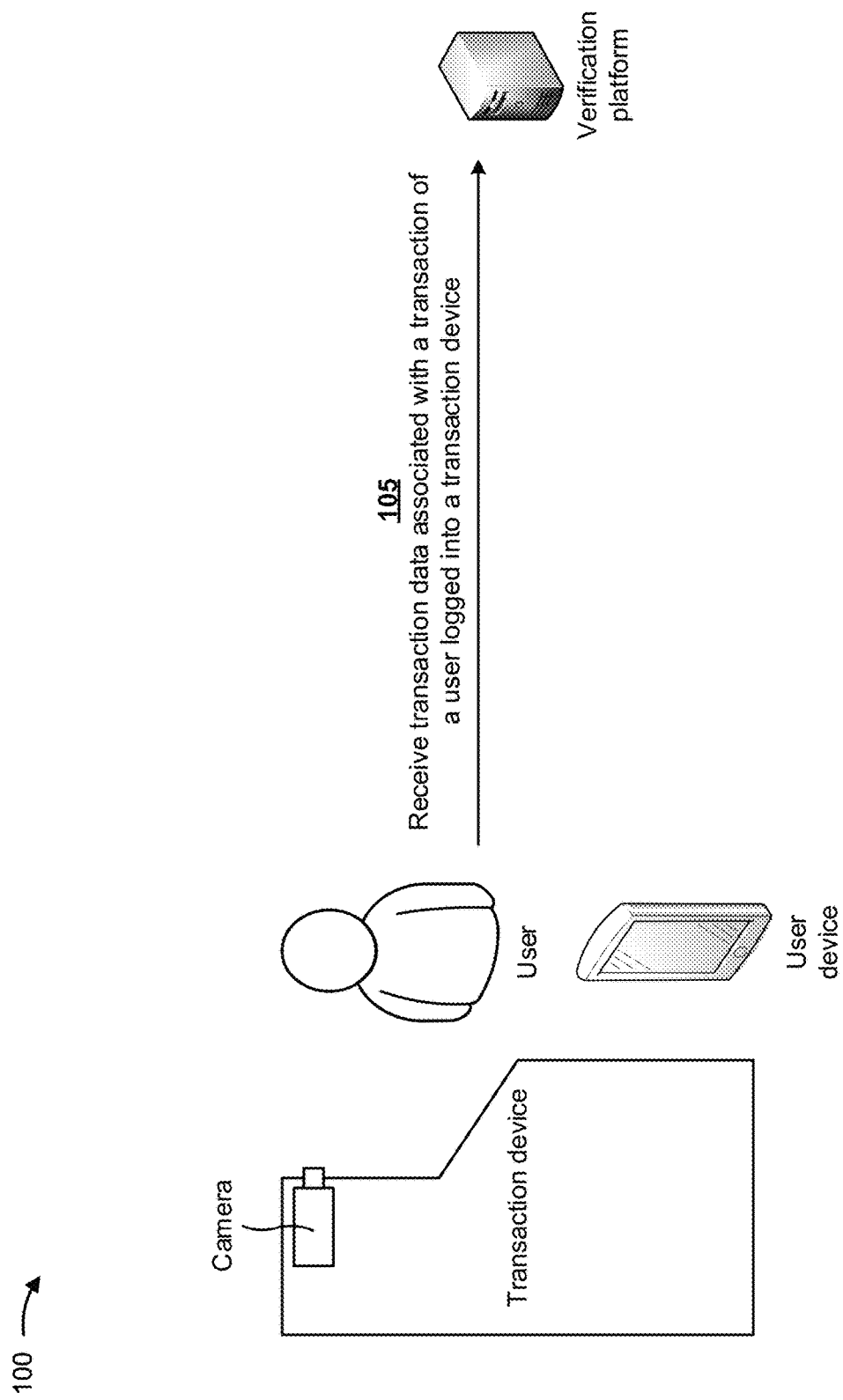
FIGS. 1A-1F are diagrams of one or more example implementations described herein.

The following detailed description of example implementations refers to the accompanying drawings. The same reference numbers in different drawings may identify the same or similar elements.

Sometimes a user of a transaction device feels unsafe when conducting a transaction at the transaction device (e.g., when someone is panhandling at the transaction device). A user may also feel captive at a transaction device when the user needs to quickly leave the transaction device during a transaction (e.g., to catch a train). However, in both situations, the user must first cancel the transaction and then must log out of the transaction device to ensure that the transaction is canceled before the user leaves the transaction device. The multiple steps required to ensure that the transaction is canceled may endanger the life of the user and/or may cause the user to be unable to quickly leave the transaction device (e.g., which may cause the user to miss a train).

Furthermore, the multiple steps waste computing resources (e.g., processing resources, memory resources, and/or the like) and network resources associated with performing the multiple steps. For example, the transaction device utilizes computing resources to perform the additional steps needed to cancel the transaction, the transaction device utilizes network resources to communicate with a backend system and cancel the transaction, the backend system utilizes computing resources to perform the additional steps needed to cancel the transaction, and/or the like.

Some implementations described herein provide a verification platform that utilizes a machine learning model to perform actions based on selection of a single selection abort transaction mechanism. For example, the verification platform may receive, from a transaction device, transaction data associated with a transaction of a user logged into the transaction device, where the transaction device may include an abort transaction mechanism that, when selected, enables the user to concurrently cancel the transaction and log out of the transaction device. The verification platform may receive information indicating a selection of the abort transaction mechanism from the transaction device to cause the transaction to be canceled concurrently with the user being logged out of the transaction device. The verification platform may provide, to a user device associated with the user and based on receiving the information indicating the selection of the abort transaction mechanism, a notification indicating that the transaction was canceled and that the user was logged out of the transaction device, and may determine whether a response, indicating that the notification was received by the user and indicating a reason for utilizing the abort transaction mechanism, is received from the user device within a threshold period of time. The verification platform may provide an alert message to an emergency point of contact for the user and/or to an emergency service when it is determined that the response is not received from the user device within the threshold period of time.

In this way, the verification platform assures a user of a transaction device that a transaction is concurrently canceled and the user logged out of the transaction device whenever the user feels unsafe and/or captive. Furthermore, the verification platform conserves computing resources (e.g., processing resources, memory resources, and/or the like) and network resources that would otherwise be wasted in performing the multiple steps required to ensure that the transaction is canceled. For example, the verification platform conserves computing resources utilized by the transaction device to perform the additional steps needed to cancel the transaction, network resources utilized by the transaction device to communicate with a backend system and cancel the transaction, computing resources utilized by the backend system to perform the additional steps needed to cancel the transaction, and/or the like.

FIGS. 1A-1F are diagrams of one or more example implementations 100 described herein. As shown in FIG. 1A, a transaction device (e.g., with a camera) may be associated with a user, a user device, and a verification platform. The user may log into the transaction device (e.g., with a transaction card and/or the user device) to conduct a transaction (e.g., a withdrawal, a deposit, a transfer, and/or the like) via the transaction device. As further shown, and by reference number 105, the verification platform may receive transaction data associated with the transaction of the user logged into the transaction device. In some implementations, the transaction data may include data identifying the user, an account associated with the user, the transaction being conducted by the user, the transaction device, a location of the transaction device, and/or the like. In some implementations, the verification platform may be associated with hundreds, thousands, millions, and/or the like of transaction devices, user devices, and users and may receive transaction data from the transaction devices.

Figure 1B:
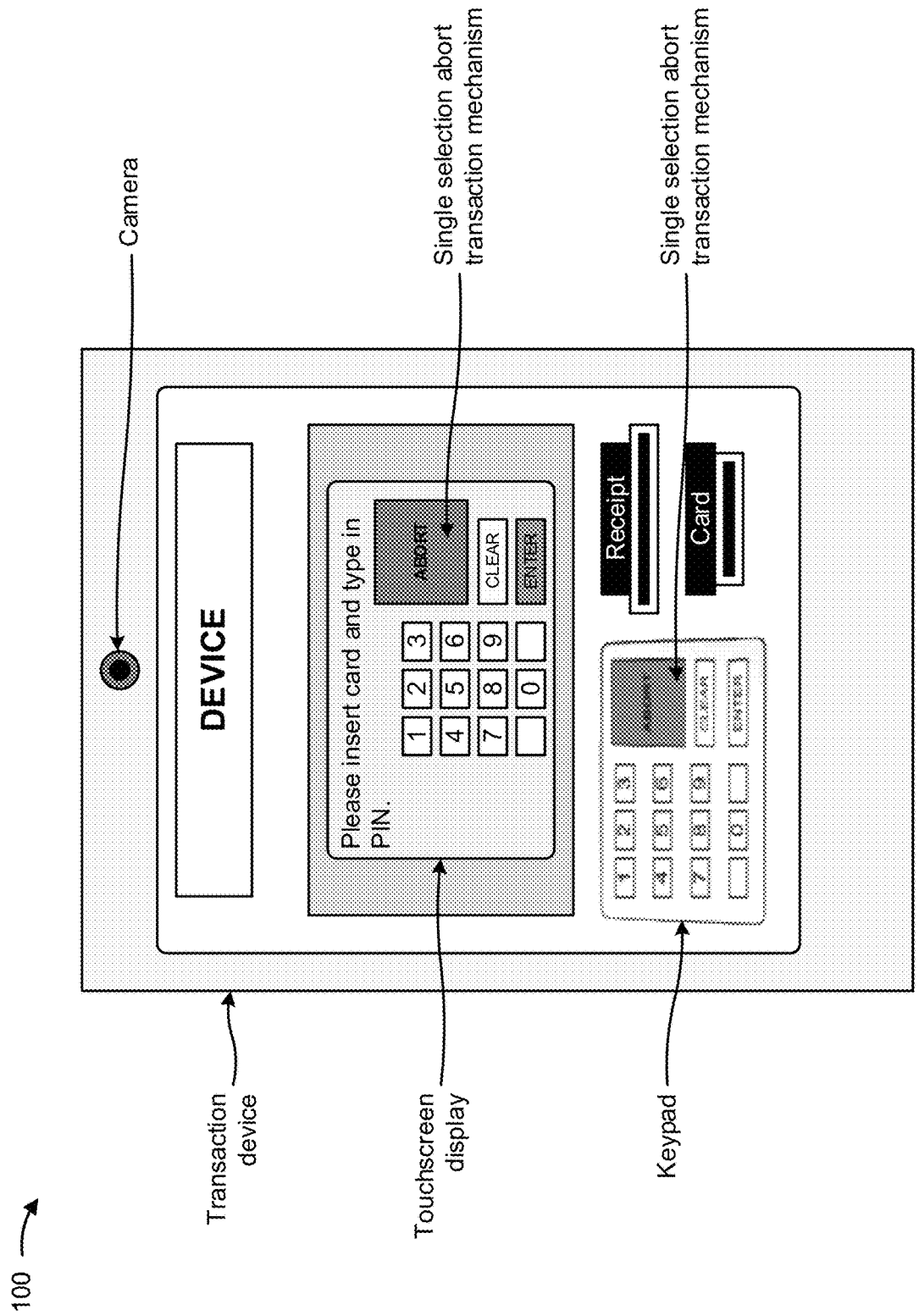

As shown in FIG. 1B, the transaction device may include a touchscreen display, a keypad, a camera, and/or the like. In some implementations, the transaction device may include a display device and keypad, a touchscreen display and no keypad, and/or one or more other components (e.g., a printer for printing a receipt, a slot for receiving a transaction card, and/or the like). In some implementations, the touchscreen display may enable the user to input sensitive information (e.g., a personal identification number (PIN), a user identifier, and/or the like), view sensitive information (e.g., an account number, an account balance, an image of a keypad, and/or the like), and/or the like. In one example, the user may utilize the image of the keypad to input a PIN of the user, to input an amount of money to withdraw, to select an account from which to withdraw the money, and/or the like.

In some implementations, the keypad may include keys, with particular numbers (e.g., 0 through 9), that may be used to enter a PIN of the user, an enter key that may be used to enter or input the PIN provided by the user, a clear key that may be used to clear the PIN input by the user, and/or the like. In some implementations, information input via the keypad may be displayed via the touchscreen display or a display device.

In some implementations, the camera may include an image capture device (e.g., a digital camera) that may be used to capture an image of the user and surroundings of the user, a video capture device (e.g., a video camera) that may be used to capture a video of the user and the surroundings of the user, and/or the like.

As further shown in FIG. 1B, the touchscreen display and/or the keypad may include a single selection abort transaction mechanism that, when selected, enables the user to concurrently cancel a transaction and log out of the transaction device. In some implementations, the single selection abort transaction mechanism may be displayed as a button or a key on the touchscreen display, may be a button or a key on the keypad, and/or the like. In some implementations, the single selection abort transaction mechanism may be selected a single time by the user to concurrently cancel the transaction and log out of the transaction device.

In some implementations, the user may select the single selection abort transaction mechanism a single time (e.g., a single tap) to have a transaction card returned, may select the single selection abort transaction mechanism two times (e.g., a double tap) to have a transaction card destroyed, and/or the like. In this way, if the user feels unsafe, the user may double tap the single selection abort transaction mechanism to have the transaction card destroyed and prevent theft of the transaction card. If the user feels safe but is just in a hurry (e.g., feels captive), the user may single tap the single selection abort transaction mechanism, receive the transaction card, and leave the transaction device knowing that the transaction was canceled and that the user is logged out of the transaction device.

Figure 1C:
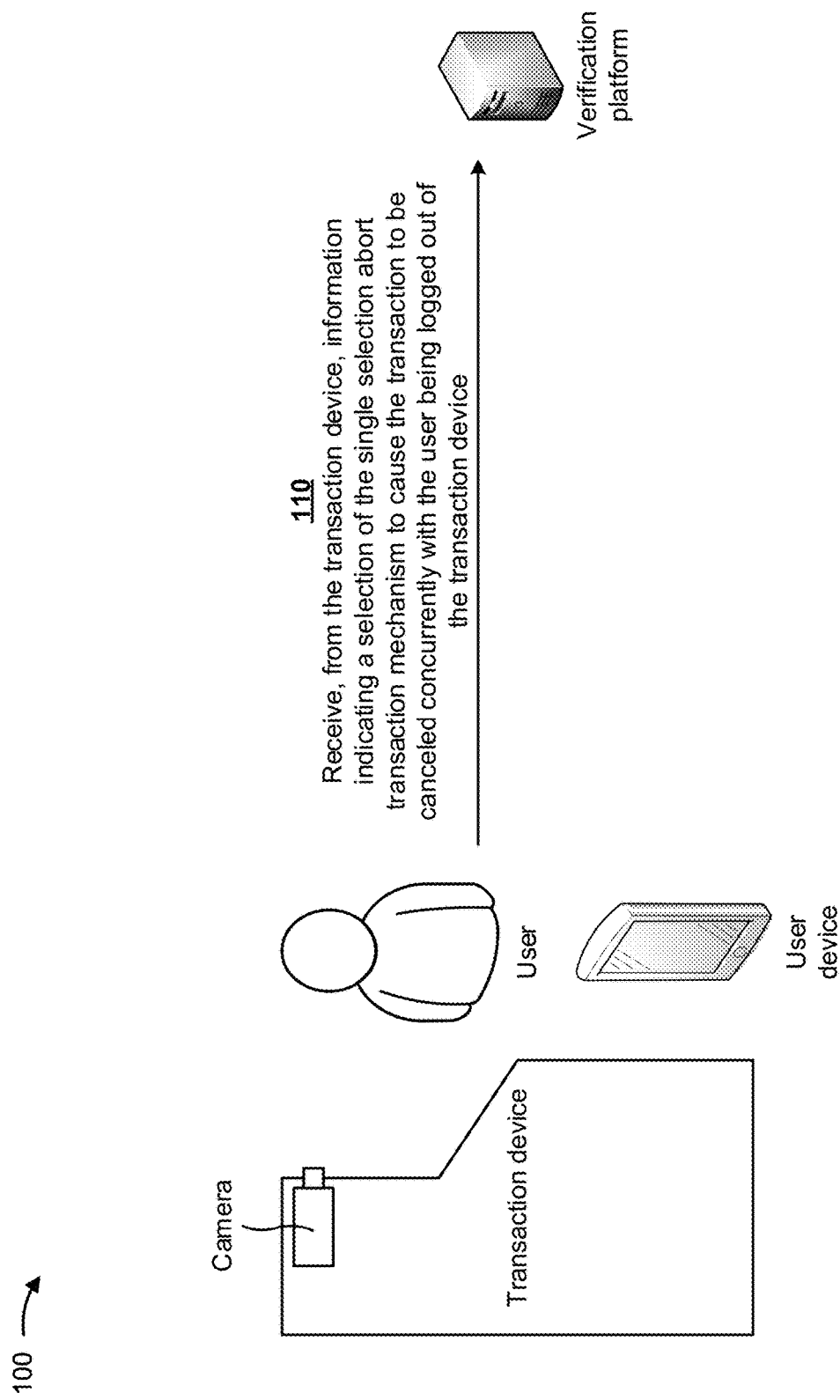

As shown in FIG. 1C, and by reference number 110, if the user selects the single selection abort transaction mechanism, the verification platform may receive, from the transaction device, information indicating a selection of the single selection abort transaction mechanism (e.g., by the user) to cause the transaction to be canceled concurrently with the user being logged out of the transaction device. In some implementations, the transaction device may concurrently cancel the transaction and log the user out of the transaction device when the user selects the single selection abort transaction mechanism. In such implementations, the transaction device may provide, to the verification platform, the information indicating the selection of the single selection abort transaction mechanism to cause the transaction to be canceled concurrently with the user being logged out of the transaction device.

In some implementations, the verification platform may receive, from the transaction device, information indicating the selection of the single selection abort transaction mechanism. In such implementations, the verification platform may concurrently cancel the transaction and log the user out of the transaction device based on the selection. The verification platform may provide, to the transaction device, information indicating that the transaction was canceled concurrently with the user being logged out of the transaction device.

In some implementations, if the transaction device retains the transaction card of the user during the transaction, selection of the single selection abort mechanism may cause a mechanical mechanism (e.g., a mechanical release lever) of the transaction device to eject the transaction card to the user. In some implementations, selection of the single selection abort mechanism may cause the transaction device to retain the transaction card with the mechanical mechanism, consume the transaction card, destroy the transaction card, lock the transaction device (e.g., and remain locked until a representative of a financial institution associated with the transaction device unlocks the transaction device), and/or the like.

Figure 1D:
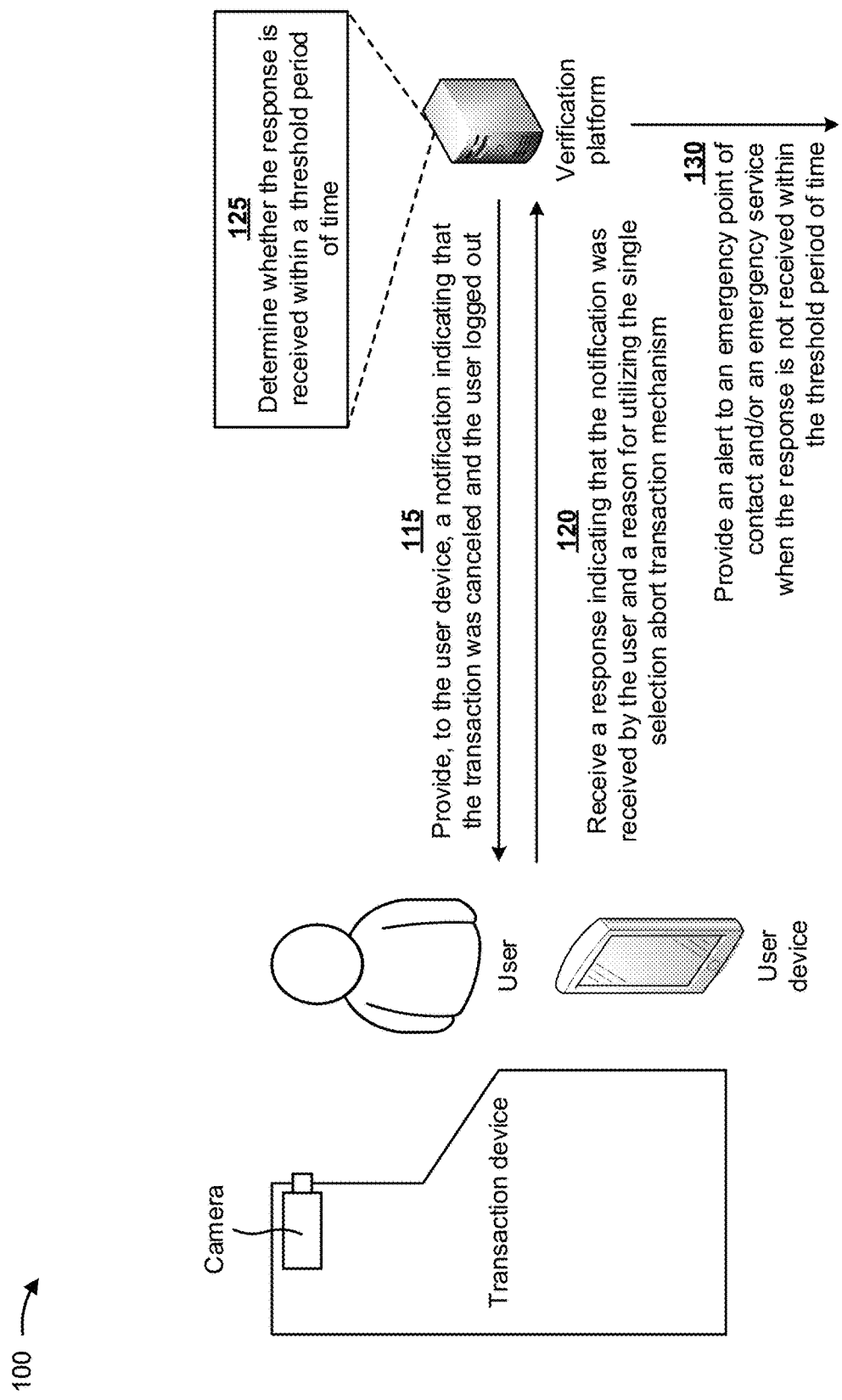

As shown in FIG. 1D, and by reference number 115, the verification platform may provide, to the user device, a notification indicating that the transaction was canceled concurrently with the user being logged out of the transaction device. In some implementations, the notification may be provided via an application, a short message service (SMS) or text message, an instant message, an email, a telephone call, and/or the like. In some implementations, the notification may include a request requesting that the user indicate that the notification was received by the user and requesting that the user indicate a reason for utilizing the single selection abort transaction mechanism. The verification platform may use information identifying the reason for utilizing the single selection abort transaction mechanism to determine one or more subsequent actions to perform, as example of which is described below in connection with FIG. 1F. In this way, the user may be informed that the transaction was canceled and that the user logged out of the transaction device, which may assure the user that credentials, the transaction card, an account, and/or the like of the user will not be compromised.

As further shown in FIG. 1D, and by reference number 120, the verification platform may receive, from the user device and based on the notification, a response indicating that the notification was received by the user and indicating a reason for utilizing the single selection abort transaction mechanism. In some implementations, the reason for utilizing the single selection abort transaction mechanism may include information indicating that the user aborted the transaction because the user felt unsafe, information indicating that the user aborted the transaction because the user was in a hurry (e.g., felt captive), information indicating that the user aborted the transaction due to another reason, and/or the like.

In some implementations, when the verification platform provides the notification to the user device, the verification platform may start a timer. As further shown in FIG. 1D, and by reference number 125, the verification platform may determine whether the response is received within a threshold period of time (e.g., in seconds, minutes, and/or the like). In some implementations, the timer may be used by the verification platform to determine whether the response is received within the threshold period of time. In this way, the verification platform may determine whether the user is safe or requires emergency assistance.

As further shown in FIG. 1D, and by reference number 130, the verification platform may provide an alert message (e.g., via a SMS message, an instant message, an email message, a telephone call, and/or the like) to an emergency point of contact and/or to an emergency service (e.g., the police) when the response is not received within the threshold period of time. In some implementations, the user may utilize a bank application to provide information identifying the emergency point of contact, and the verification platform may utilize such information to provide the alert message to the emergency point of contact. In some implementations, the verification platform may determine a location of the user (e.g., based on a location of the transaction device, the user device, and/or the like), and may identify an emergency service that is closest to the location of the user. This way the emergency service may respond more quickly to the alert message and assist the user.

In some implementations, the transaction device may capture video of the area surrounding the transaction device when the response is not received within the threshold period of time. Emergency responders may use the captured video to assist the user (e.g., by identifying an individual who was making the user feel unsafe).

Figure 1E:
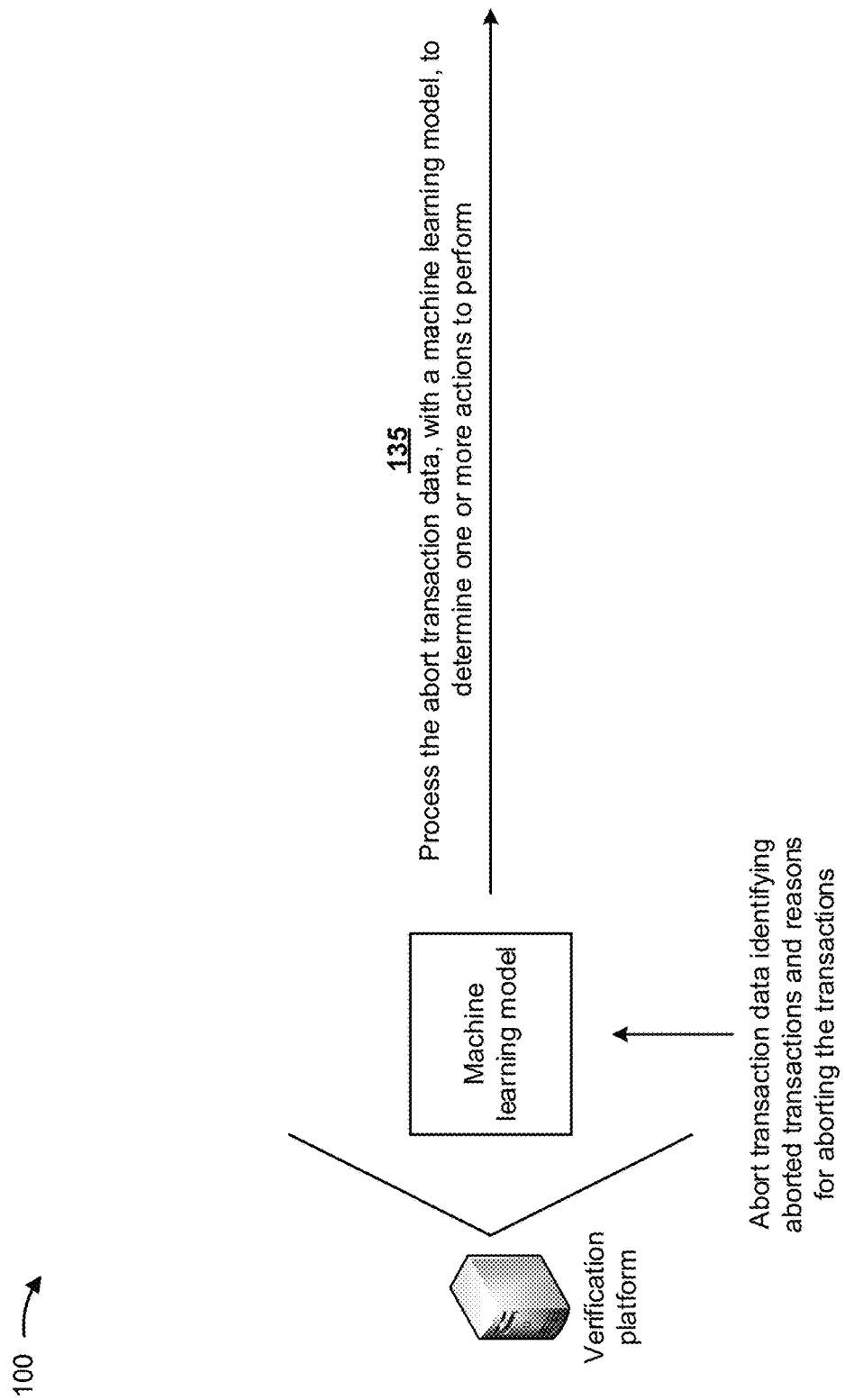

As shown in FIG. 1E, the verification platform may receive abort transaction data identifying the aborted transaction by the user, aborted transactions by other users of the transaction device, a reason the transaction was aborted by the user, reasons the other users aborted the transactions, and/or the like. As further shown in FIG. 1E, and by reference number 135, the verification platform may process the abort transaction data, with a machine learning model, to determine one or more actions to perform. In some implementations, the machine learning model may include a pattern recognition model that generates predictions for one or more actions to perform based on abort transaction data. In some implementations, the one or more actions that may be predicted by the machine learning model are described below in connection with FIG. 1F.

In some implementations, the verification platform may perform a training operation on the machine learning model with historical abort transaction data. The historical abort transaction data may include data identifying aborted transactions by users of the transaction device, data indicating that the users aborted the transactions because they felt unsafe at the transaction device, data indicating that the users aborted the transactions because they were in a hurry, data indicating that the users aborted the transactions for other reasons, and/or the like.

In some implementations, the verification platform may separate the historical abort transaction data into a training set, a validation set, a test set, and/or the like. The training set may be utilized to train the machine learning model. The validation set may be utilized to validate results generated based on training the machine learning model with the training set. The test set may be utilized to test results generated by the trained machine learning model.

In some implementations, the verification platform may train the machine learning model using, for example, an unsupervised training procedure and based on the training set of the historical abort transaction data. For example, the verification platform may perform dimensionality reduction to reduce the historical abort transaction data to a minimum feature set, thereby reducing resources (e.g., processing resources, memory resources, and/or the like) to train the machine learning model and may apply a classification technique to the minimum feature set.

In some implementations, the verification platform may use a logistic regression classification technique to determine a categorical outcome (e.g., that one or more actions should be performed based on the historical abort transaction data). Additionally, or alternatively, the verification platform may use a naïve Bayesian classifier technique. In this case, the verification platform may perform binary recursive partitioning to split the historical abort transaction data into partitions and/or branches and use the partitions and/or branches to perform predictions (e.g., that one or more actions should be performed based on the historical abort transaction data). Based on using recursive partitioning, the verification platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the verification platform may use a support vector machine (SVM) classifier technique to generate a non-linear boundary between data points in the training set. In this case, the non-linear boundary is used to classify test data into a particular class.

Additionally, or alternatively, the verification platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the verification platform may use one or more other model training techniques, such as a neural network technique, a latent semantic indexing technique, and/or the like. For example, the verification platform may perform an artificial neural network processing technique (e.g., using a two-layer feedforward neural network architecture, a three-layer feedforward neural network architecture, and/or the like) to perform pattern recognition with regard to optimal regions of the historical abort transaction data. In this case, using the artificial neural network processing technique may improve an accuracy of the trained machine learning model generated by the verification platform by enabling the model to be more robust than unprocessed models to noisy, imprecise, or incomplete data, and by enabling the verification platform to detect patterns and/or trends undetectable to human analysts or systems using less complex techniques.

In some implementations, the verification platform may receive the trained machine learning model from another source. In such implementations, the verification platform may utilize the trained machine learning model to process the abort transaction data and to determine one or more actions to perform based on the abort transaction data.

In this way, the verification platform may provide the abort transaction data as an input to the machine learning model, and the machine learning model may output information indicating the one or more actions to perform based on the input.

Figure 1F:
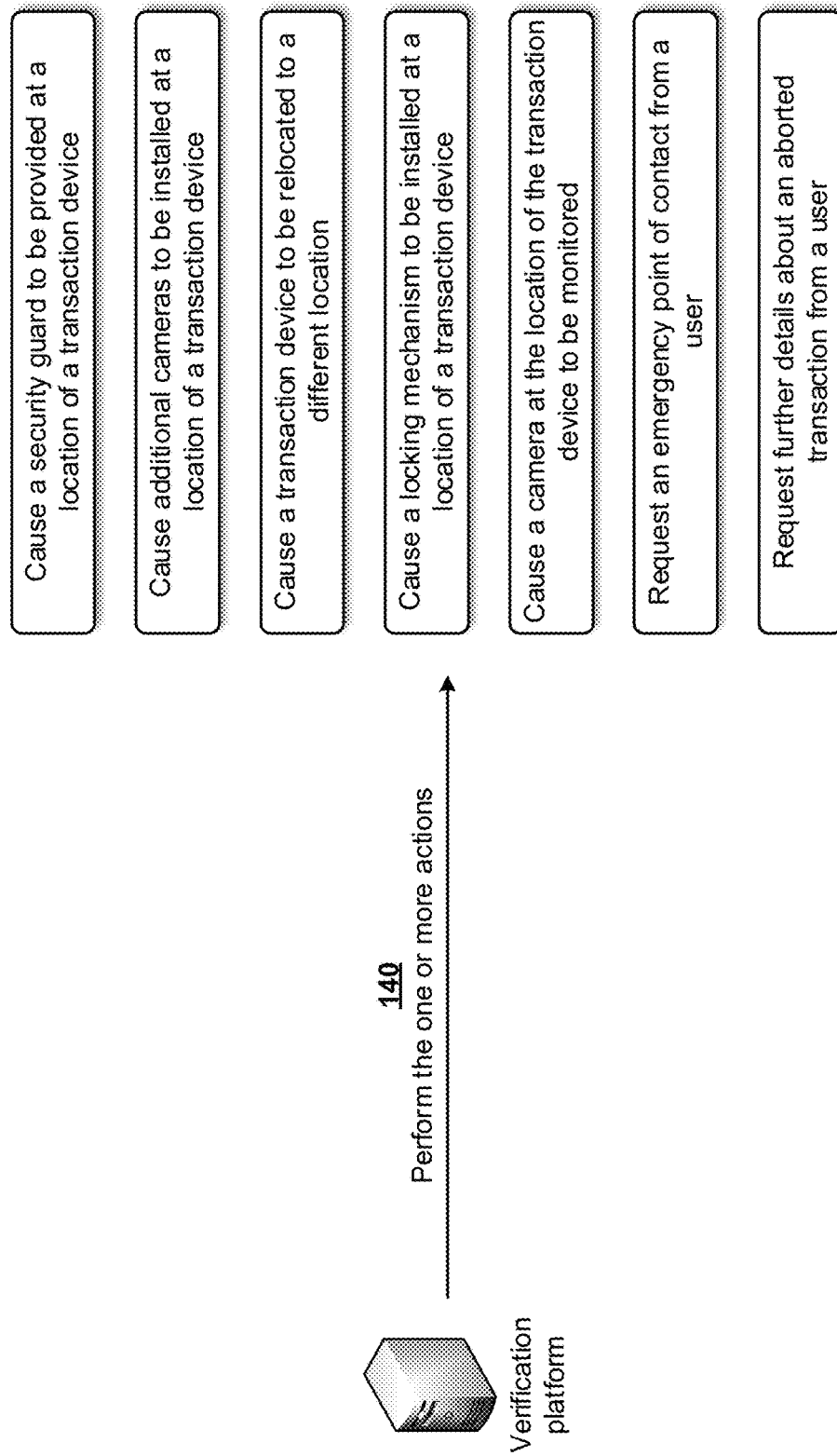

As shown in FIG. 1F, and by reference number 140, the verification platform may perform the one or more actions. For example, the one or more actions may include the verification platform causing a security guard to be dispatched to a location of the transaction device. Here, the verification platform may send a message (e.g., a text message) or place a telephone call to a device of the security guard or a device of a command center to cause the security guard to be dispatched to the location. In this way, the verification platform improves the safety of users of the transaction device and ensures that the users that they will feel safe. This may reduce utilization of the single selection abort mechanism at the transaction device, which may conserve computing resources and network resources.

In some implementations, the one or more actions may include the verification platform causing additional cameras to be installed at the location of the transaction device. For example, the verification platform may identify a local security company (e.g., via an Internet search) and cause a purchase/work order to be submitted to the local security company for the additional camera installation. In this way, the verification platform improves the safety of users of the transaction device and ensures that the users that they will feel safe. This may reduce utilization of the single selection abort mechanism at the transaction device, which may conserve computing resources and network resources.

In some implementations, the one or more actions may include the verification platform causing the transaction device to be relocated to a different location. For example, the verification platform may identify a local company (e.g., via an Internet search) and cause a work order to be submitted to the local company for the transaction device relocation. In this way, the verification platform may provide a safer location for the transaction device, which may reduce utilization of the single selection abort mechanism at the transaction device and conserve computing resources and network resources.

In some implementations, the one or more actions may include the verification platform causing a locking mechanism to be installed at the location of the transaction device. For example, a door to the transaction device may be locked and opened only by users with their transaction cards and/or with their user devices (e.g., via a bank application on their user devices). In this example, the verification platform may identify a local security company (e.g., via an Internet search) and cause a purchase/work order to be submitted to the local security company for the lock installation. In this way, the verification platform improves the safety of users of the transaction device and ensures that the users that they will feel safe. This may reduce utilization of the single selection abort mechanism at the transaction device, which may conserve computing resources and network resources.

In some implementations, the one or more actions may include the verification platform causing a camera at the location of the transaction device (e.g., the camera provided with the transaction device) to be monitored. In some implementations, the verification platform may receive camera data from the camera monitoring the location of the transaction device and may predict the reason for utilizing the single selection abort transaction mechanism based on the camera data. In this way, the verification platform may determine whether the user is in danger and may dispatch emergency personnel when the user is in danger.

In some implementations, the one or more actions may include the verification platform requesting information identifying an emergency point of contact from the user. For example, the verification platform may request the information identifying the emergency point of contact when the user failed to provide such information. In this way, the verification platform may obtain an emergency point of contact that may be utilized when the user does not respond to the notification from the verification platform.

In some implementations, the one or more actions may include the verification platform requesting further details about an aborted transaction from the user. In this way, the verification platform may receive additional information about the aborted transaction, which may be utilized to improve the machine learning model, to enhance the safety of the user, and/or the like.

The above actions are provided merely by way of example. The verification platform may perform additional or different actions than those described above. For example, in some implementations, the verification platform may cause the transaction device to be temporarily locked, so as not to allow subsequent transactions to be performed at the transaction device. This action may be beneficial in situations where the user who aborted the transaction indicated that the reason for aborting the transaction is that a suspicious individual was lurking around the transaction device. In some implementations, the verification platform may cause the transaction device to display a message, such as "out of order." In this way, the verification platform may notify other users not to use this particular transaction device.

In some implementations, the one or more actions may include the verification platform determining that the user aborted the transaction because the user was in a hurry (e.g., but felt safe), and providing, to the user device, a notification indicating that the transaction was canceled and the user logged out of the transaction device. In such implementations, the verification platform may not require the user to acknowledge receipt of the notification and may not provide messages to an emergency point of contact and/or an emergency service since the user was self and just in a hurry. The verification platform may utilize the machine learning model to determine (e.g., from a camera feed associated with the transaction device and/or from previous user interactions with transaction devices) that the user is not in danger. Therefore, the verification platform may not require acknowledgement of the notification and may not alert the emergency point of contact and/or the emergency service.

In this way, several different stages of the process for performing actions based on selection of a single selection abort transaction mechanism may be automated with a machine learning model, which may conserve computing resources (e.g., processing resources, memory resources, and/or the like). Furthermore, implementations described herein use a rigorous, computerized process to perform tasks or roles that were not previously performed. For example, currently there does not exist a technique that utilizes a single selection abort transaction mechanism or a machine learning model to perform actions based on selection of the single selection abort transaction mechanism. Further, the process for performing actions based on selection of a single selection abort transaction mechanism conserves computing resources (e.g., processing resources, memory resources, and/or the like) that would otherwise be wasted in performing multiple steps required to ensure that a transaction is canceled.

As indicated above, FIGS. 1A-1F are provided merely as examples. Other examples may differ from what is described with regard to FIGS. 1A-1F.

Figure 2:
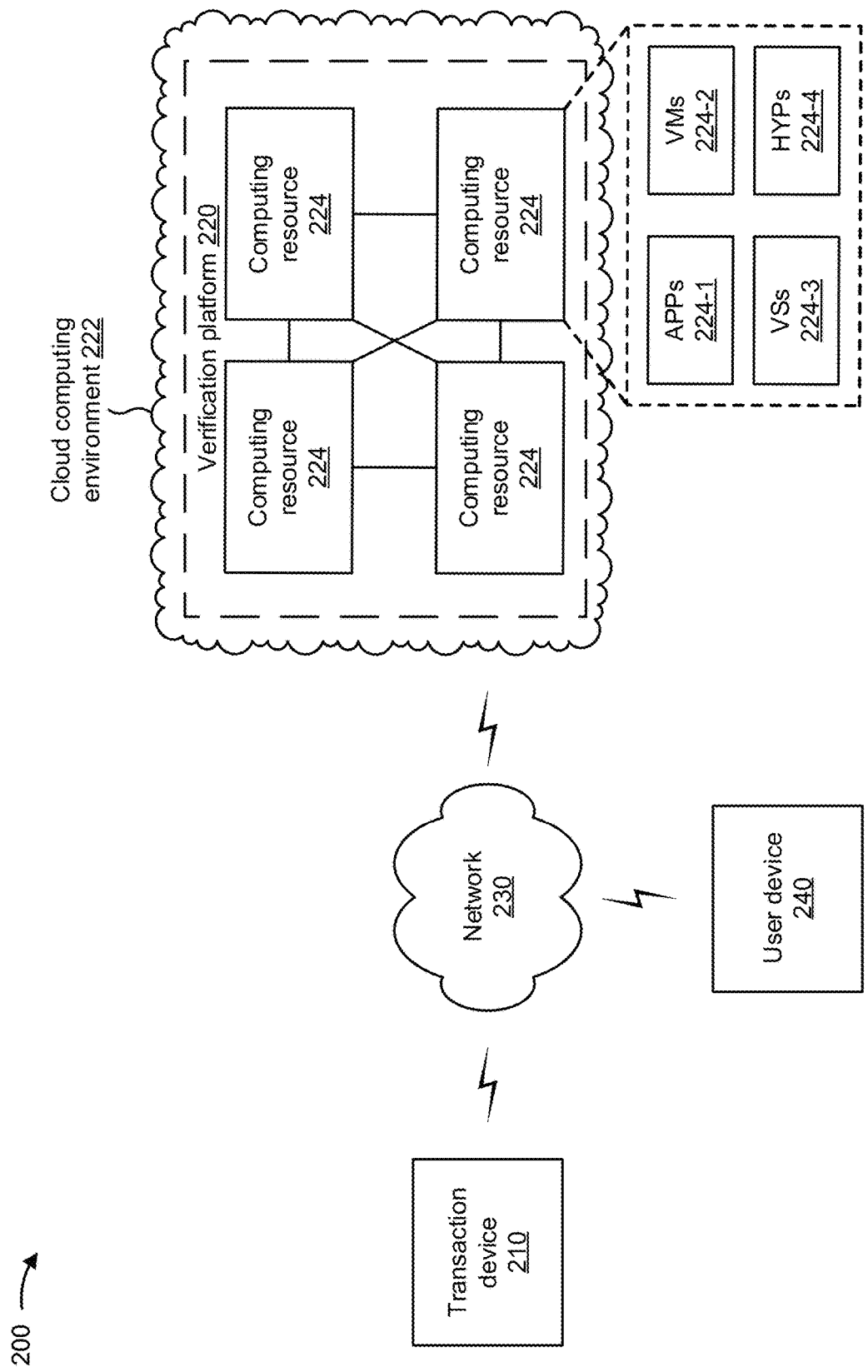
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a transaction device 210, a verification platform 220, a network 230, and a user device 240. Devices of environment 200 may interconnect via wired connections, wireless connections, or a combination of wired and wireless connections.

Transaction device 210 includes one or more devices capable of receiving, generating, storing, processing, and/or providing information, such as information described herein. For example, transaction device 210 may include an automated teller machine (ATM) device, a point of sale (POS) device, a kiosk device, and/or the like.

The ATM device may include an electronic telecommunications device that enables customers of financial institutions to perform financial transactions, such as cash withdrawals, deposits, transferring funds, obtaining account information, and/or the like, at any time and without direct interaction with employees of the financial institutions. The POS device may include an electronic device used to process transaction card payments at retail locations. The POS device may read information from a transaction card (e.g., a credit card, a debit card, a gift card, and/or the like), and may determine whether there are sufficient funds in an account associated with the transaction card for a transaction. The POS device may transfer funds from the account associated with the transaction card to an account of a retailer and may record the transaction. The kiosk device may include a computer terminal featuring specialized hardware and/or software that provides access to information and/or applications for communication, commerce, entertainment, education, and/or the like.

In some implementations, transaction device 210 may include an input element (e.g., a keypad, a keyboard, a touchscreen display, and/or the like) for receiving input data from a user of the transaction device. In some implementations, transaction device 210 may include more than one input element (e.g., a keypad and a touchscreen display). Additionally, or alternatively, transaction device 210 may include one or more sensors, such as a camera.

Verification platform 220 includes one or more devices that may utilize a machine learning model to perform actions based on selection of a single selection abort transaction mechanism. In some implementations, verification platform 220 may be modular such that certain software components may be swapped in or out depending on a particular need. As such, verification platform 220 may be easily and/or quickly reconfigured for different uses. In some implementations, verification platform 220 may receive information from and/or transmit information to one or more transaction devices 210 and/or user devices 240.

In some implementations, as shown, verification platform 220 may be hosted in a cloud computing environment 222.

Notably, while implementations described herein describe verification platform 220 as being hosted in cloud computing environment 222, in some implementations, verification platform 220 may be non-cloud-based (i.e., may be implemented outside of a cloud computing environment) or may be partially cloud-based.

Cloud computing environment 222 includes an environment that may host verification platform 220. Cloud computing environment 222 may provide computation, software, data access, storage, etc. services that do not require end-user knowledge of a physical location and configuration of system(s) and/or device(s) that host verification platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host verification platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by transaction device 210 and/or user device 240. Application 224-1 may eliminate a need to install and execute the software applications on transaction device 210 and/or user device 240. For example, application 224-1 may include software associated with verification platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of transaction device 210 and/or user device 240 or an operator of verification platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

User device 240 includes one or more devices capable of receiving, generating, storing, processing, and/or providing information, such as information described herein. For example, user device 240 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 240 may receive information from and/or transmit information to transaction device 210 and/or verification platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
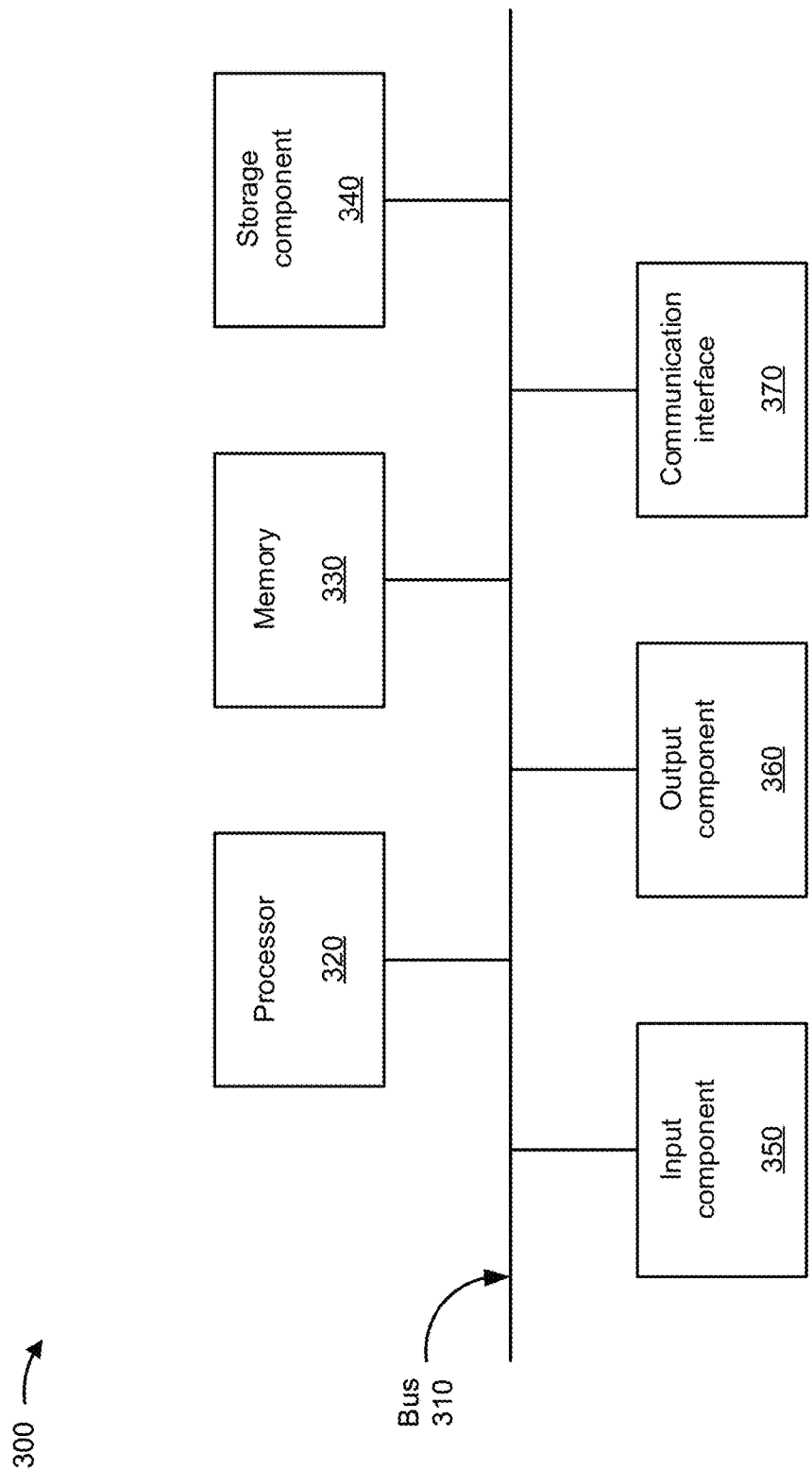
FIG. 3 is a diagram of example components of one or more devices of FIG. 2.

FIG. 3 is a diagram of example components of a device 300. Device 300 may correspond to transaction device 210, verification platform 220, computing resource 224, and/or user device 240. In some implementations, transaction device 210, verification platform 220, computing resource 224, and/or user device 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
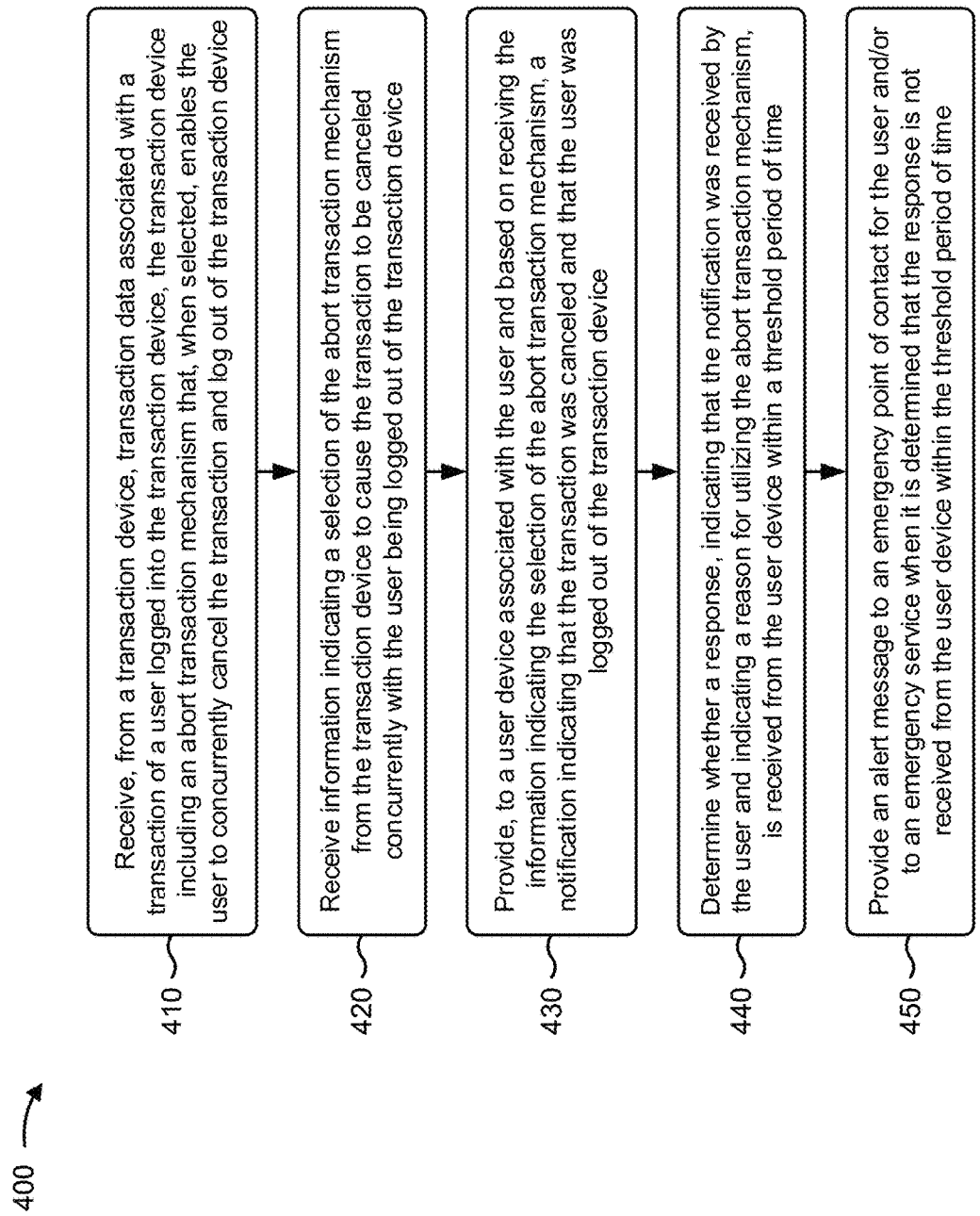
FIGS. 4-6 are flow charts of example processes for utilizing a machine learning model to perform actions based on selection of a single selection abort transaction mechanism.

FIG. 4 is a flow chart of an example process 400 for utilizing a machine learning model to perform actions based on selection of a single selection abort transaction mechanism. In some implementations, one or more process blocks of FIG. 4 may be performed by a verification platform (e.g., verification platform 220). In some implementations, one or more process blocks of FIG. 4 may be performed by another device or a group of devices separate from or including the verification platform, such as a transaction device (e.g., transaction device 210) and/or a user device (e.g., user device 240).

As shown in FIG. 4, process 400 may include receiving, from a transaction device, transaction data associated with a transaction of a user logged into the transaction device, the transaction device including an abort transaction mechanism that, when selected, enables the user to concurrently cancel the transaction and log out of the transaction device (block 410). For example, the verification platform (e.g., using computing resource 224, processor 320, communication interface 370, and/or the like) may receive, from a transaction device, transaction data associated with a transaction of a user logged into the transaction device, as described above in connection with FIGS. 1A-2. In some implementations, the transaction device may include an abort transaction mechanism that, when selected, enables the user to concurrently cancel the transaction and log out of the transaction device.

As further shown in FIG. 4, process 400 may include receiving information indicating a selection of the abort transaction mechanism from the transaction device to cause the transaction to be canceled concurrently with the user being logged out of the transaction device (block 420). For example, the verification platform (e.g., using computing resource 224, processor 320, communication interface 370, and/or the like) may receive information indicating a selection of the abort transaction mechanism from the transaction device to cause the transaction to be canceled concurrently with the user being logged out of the transaction device, as described above in connection with FIGS. 1A-2.

As further shown in FIG. 4, process 400 may include providing, to a user device associated with the user, and based on receiving the information indicating the selection of the abort transaction mechanism, a notification indicating that the transaction was canceled and that the user was logged out of the transaction device (block 430). For example, the verification platform (e.g., using computing resource 224, processor 320, storage component 340, communication interface 370, and/or the like) may provide, to a user device associated with the user, and based on receiving the information indicating the selection of the abort transaction mechanism, a notification indicating that the transaction was canceled and that the user was logged out of the transaction device, as described above in connection with FIGS. 1A-2.

As further shown in FIG. 4, process 400 may include determining whether a response, indicating that the notification was received by the user and indicating a reason for utilizing the abort transaction mechanism, is received from the user device within a threshold period of time (block 440). For example, the verification platform (e.g., using computing resource 224, processor 320, memory 330, and/or the like) may determine whether a response, indicating that the notification was received by the user and indicating a reason for utilizing the abort transaction mechanism, is received from the user device within a threshold period of time, as described above in connection with FIGS. 1A-2.

As further shown in FIG. 4, process 400 may include providing an alert message to an emergency point of contact for the user and/or to an emergency service when it is determined that the response is not received from the user device within the threshold period of time (block 450). For example, the verification platform (e.g., using computing resource 224, processor 320, memory 330, communication interface 370, and/or the like) may provide an alert message to an emergency point of contact for the user and/or to an emergency service when it is determined that the response is not received from the user device within the threshold period of time, as described above in connection with FIGS. 1A-2.

Process 400 may include additional implementations, such as any single implementation or any combination of implementations described below and/or described with regard to any other process described herein.

In some implementations, the verification platform may process information identifying the reason for utilizing the abort transaction mechanism, with a machine learning model, to determine one or more actions to perform, and may perform the one or more actions.

In some implementations, when performing the one or more actions, the verification platform may cause a security guard to be provided at a location of the transaction device, may cause a camera at the location of the transaction device to be monitored, may cause an additional camera to be installed at the location of the transaction device, may cause the transaction device to be relocated to a different location from the location of the transaction device, may cause a locking mechanism to be installed at the location of the transaction device, may request information identifying the emergency point of contact from the user device, and/or may request further details about the transaction from the user device.

In some implementations, information identifying the reason for utilizing the abort transaction mechanism may include information indicating that the user aborted the transaction because the user felt unsafe, and/or information indicating that the user aborted the transaction because the user was in a hurry.

In some implementations, the transaction device may include a mechanical mechanism to retain a transaction card of the user during the transaction, and the verification platform may cause the mechanical mechanism to release the transaction card based on the selection of the abort transaction mechanism, where the transaction is canceled concurrently with the user being logged out of the transaction device after causing the mechanical mechanism to release the transaction card.

In some implementations, the transaction device may include a mechanical mechanism to retain or destroy a transaction card of the user during the transaction, and the verification platform may cause the mechanical mechanism to retain or destroy the transaction card based on the selection of the abort transaction mechanism. In some implementations, the verification platform may cause a camera, located at a location of the transaction device, to capture images and/or video of the location, based on the selection of the abort transaction mechanism.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
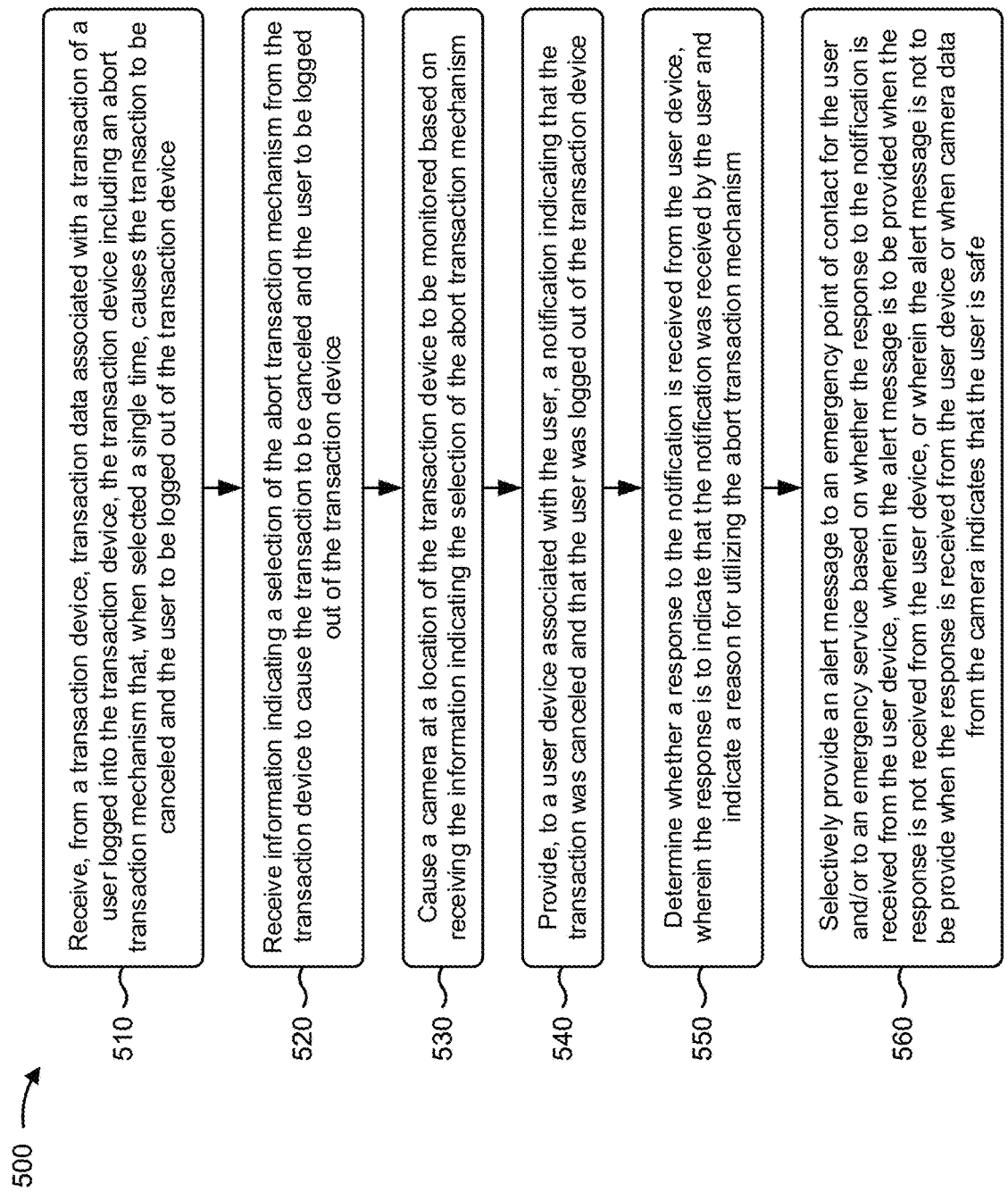

FIG. 5 is a flow chart of an example process 500 for utilizing a machine learning model to perform actions based on selection of a single selection abort transaction mechanism. In some implementations, one or more process blocks of FIG. 5 may be performed by a verification platform (e.g., verification platform 220). In some implementations, one or more process blocks of FIG. 5 may be performed by another device or a group of devices separate from or including the verification platform, such as a transaction device (e.g., transaction device 210) and/or a user device (e.g., user device 240).

As shown in FIG. 5, process 500 may include receiving, from a transaction device, transaction data associated with a transaction of a user logged into the transaction device, the transaction device including an abort transaction mechanism that, when selected a single time, causes the transaction to be canceled and the user to be logged out of the transaction device (block 510). For example, the verification platform (e.g., using computing resource 224, processor 320, communication interface 370, and/or the like) may receive, from a transaction device, transaction data associated with a transaction of a user logged into the transaction device, as described above in connection with FIGS. 1A-2. In some implementations, the transaction device may include an abort transaction mechanism that, when selected a single time, causes the transaction to be canceled and the user to be logged out of the transaction device.

As further shown in FIG. 5, process 500 may include receiving information indicating a selection of the abort transaction mechanism from the transaction device to cause the transaction to be canceled and the user to be logged out of the transaction device (block 520). For example, the verification platform (e.g., using computing resource 224, processor 320, communication interface 370, and/or the like) may receive information indicating a selection of the abort transaction mechanism from the transaction device to cause the transaction to be canceled and the user to be logged out of the transaction device, as described above in connection with FIGS. 1A-2.

As further shown in FIG. 5, process 500 may include causing a camera at a location of the transaction device to be monitored based on receiving the information indicating the selection of the abort transaction mechanism (block 530). For example, the verification platform (e.g., using computing resource 224, processor 320, memory 330, communication interface 370, and/or the like) may cause a camera at a location of the transaction device to be monitored based on receiving the information indicating the selection of the abort transaction mechanism, as described above in connection with FIGS. 1A-2.

As further shown in FIG. 5, process 500 may include providing, to a user device associated with the user, a notification indicating that the transaction was canceled and that the user was logged out of the transaction device (block 540). For example, the verification platform (e.g., using computing resource 224, processor 320, communication interface 370, and/or the like) may provide, to a user device associated with the user, a notification indicating that the transaction was canceled and that the user was logged out of the transaction device, as described above in connection with FIGS. 1A-2.

As further shown in FIG. 5, process 500 may include determining whether a response to the notification is received from the user device, wherein the response is to indicate that the notification was received by the user and indicate a reason for utilizing the abort transaction mechanism (block 550). For example, the verification platform (e.g., using computing resource 224, processor 320, memory 330, and/or the like) may determine whether a response to the notification is received from the user device, as described above in connection with FIGS. 1A-2. In some implementations, the response is to indicate that the notification was received by the user and indicate a reason for utilizing the abort transaction mechanism.

As further shown in FIG. 5, process 500 may include selectively providing an alert message to an emergency point of contact for the user and/or to an emergency service based on whether the response to the notification is received from the user device, wherein the alert message is to be provided when the response is not received from the user device, or wherein the alert message is not to be provided when the response is received from the user device or when camera data from the camera indicates that the user is safe (block 560). For example, the verification platform (e.g., using computing resource 224, processor 320, storage component 340, communication interface 370, and/or the like) may selectively provide an alert message to an emergency point of contact for the user and/or to an emergency service based on whether the response to the notification is received from the user device, as described above in connection with FIGS. 1A-2. In some implementations, the alert message is to be provided when the response is not received from the user device. In some implementations, the alert message is not to be provided when the response is received from the user device or when camera data from the camera indicates that the user is safe.

Process 500 may include additional implementations, such as any single implementation or any combination of implementations described below and/or described with regard to any other process described herein.

In some implementations, the verification platform may process information identifying the reason for utilizing the abort transaction mechanism and information identifying reasons for utilizing the abort transaction mechanism by other users of the transaction device, with a machine learning model, to determine one or more actions to perform, and may perform the one or more actions.

In some implementations, when performing the one or more actions, the verification platform may cause a security guard to be provided at the location of the transaction device, may cause an additional camera to be installed at the location of the transaction device, may cause the transaction device to be relocated to a different location from the location of the transaction device, and/or may cause a locking mechanism to be installed at the location of the transaction device.

In some implementations, the verification platform may receive camera data from the camera monitoring the location of the transaction device, and may predict the reason for utilizing the abort transaction mechanism based on the camera data. In some implementations, the verification platform may cause the transaction device to release a transaction card associated with the user based on the selection of the abort transaction mechanism, and the transaction card may be released by the transaction device before the transaction is canceled and the user is logged out of the transaction device.

In some implementations, the verification platform may cause the transaction device to destroy a transaction card associated with the user based on the selection of the abort transaction mechanism. In some implementations, information identifying the reason for utilizing the abort transaction mechanism may include information indicating that the user aborted the transaction because the user felt unsafe, or information indicating that the user aborted the transaction because the user was in a hurry.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
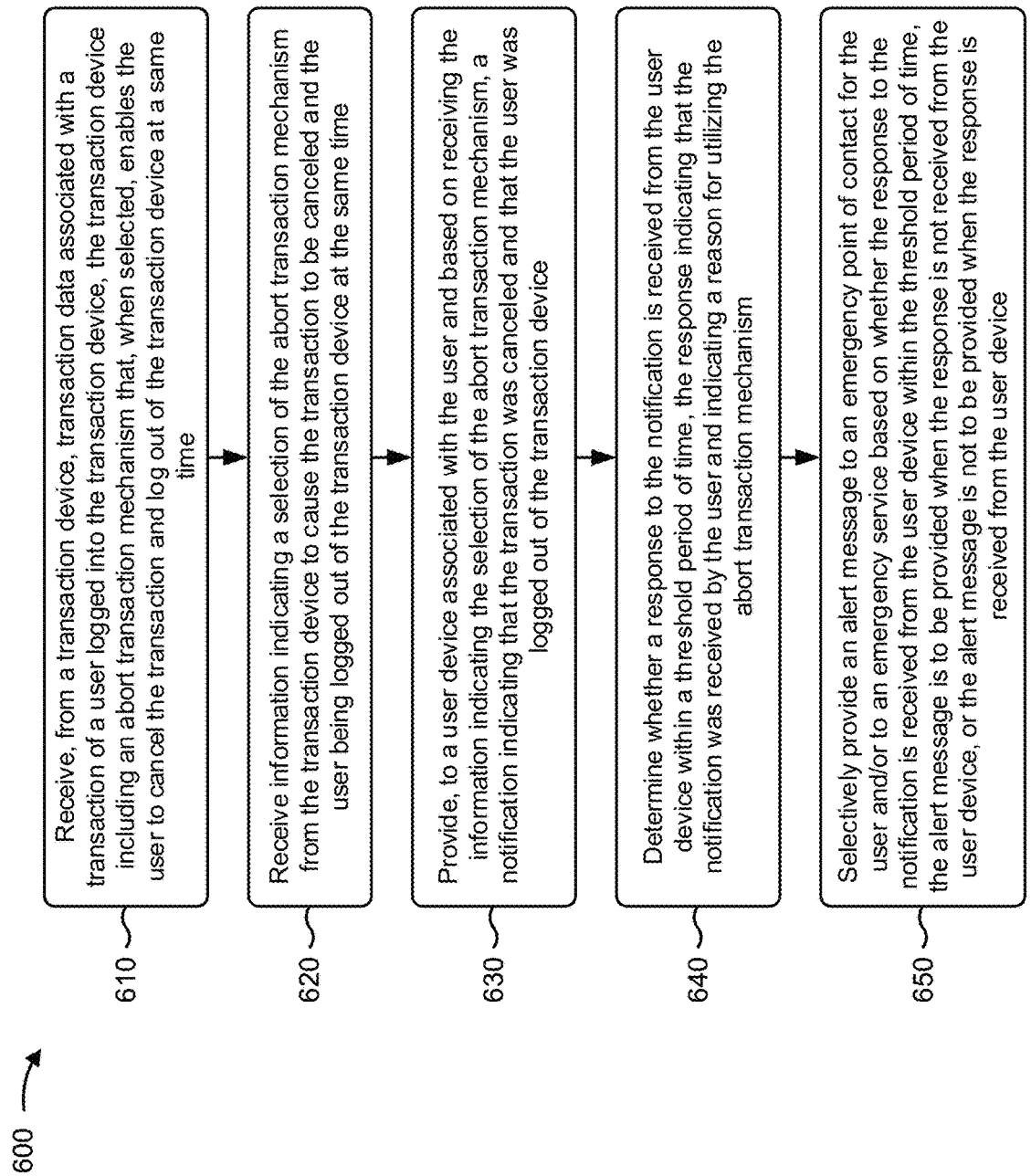

FIG. 6 is a flow chart of an example process 600 for utilizing a machine learning model to perform actions based on selection of a single selection abort transaction mechanism. In some implementations, one or more process blocks of FIG. 6 may be performed by a verification platform (e.g., verification platform 220). In some implementations, one or more process blocks of FIG. 6 may be performed by another device or a group of devices separate from or including the verification platform, such as a transaction device (e.g., transaction device 210) and/or a user device (e.g., user device 240).

As shown in FIG. 6, process 600 may include receiving, from a transaction device, transaction data associated with a transaction of a user logged into the transaction device, the transaction device including an abort transaction mechanism that, when selected, enables the user to cancel the transaction and log out of the transaction device at a same time (block 610). For example, the verification platform (e.g., using computing resource 224, processor 320, communication interface 370, and/or the like) may receive, from a transaction device, transaction data associated with a transaction of a user logged into the transaction device, as described above in connection with FIGS. 1A-2. In some implementations, the transaction device may include an abort transaction mechanism that, when selected, enables the user to cancel the transaction and log out of the transaction device at a same time.

As further shown in FIG. 6, process 600 may include receiving information indicating a selection of the abort transaction mechanism from the transaction device to cause the transaction to be canceled and the user being logged out of the transaction device at the same time (block 620). For example, the verification platform (e.g., using computing resource 224, processor 320, communication interface 370, and/or the like) may receive information indicating a selection of the abort transaction mechanism from the transaction device to cause the transaction to be canceled and the user being logged out of the transaction device at the same time, as described above in connection with FIGS. 1A-2.

As further shown in FIG. 6, process 600 may include providing, to a user device associated with the user and based on receiving the information indicating the selection of the abort transaction mechanism, a notification indicating that the transaction was canceled and that the user was logged out of the transaction device (block 630). For example, the verification platform (e.g., using computing resource 224, processor 320, storage component 340, communication interface 370, and/or the like) may provide, to a user device associated with the user and based on receiving the information indicating the selection of the abort transaction mechanism, a notification indicating that the transaction was canceled and that the user was logged out of the transaction device, as described above in connection with FIGS. 1A-2.

As further shown in FIG. 6, process 600 may include determining whether a response to the notification is received from the user device within a threshold period of time, the response indicating that the notification was received by the user and indicating a reason for utilizing the abort transaction mechanism (block 640). For example, the verification platform (e.g., using computing resource 224, processor 320, memory 330, communication interface 370, and/or the like) may determine whether a response to the notification is received from the user device within a threshold period of time, as described above in connection with FIGS. 1A-2. In some implementations, the response may indicate that the notification was received by the user and may indicate a reason for utilizing the abort transaction mechanism.

As further shown in FIG. 6, process 600 may include selectively providing an alert message to an emergency point of contact for the user and/or to an emergency service based on whether the response to the notification is received from the user device within the threshold period of time, the alert message is to be provided when the response is not received from the user device, or the alert message is not to be provided when the response is received from the user device (block 650). For example, the verification platform (e.g., using computing resource 224, processor 320, memory 330, communication interface 370, and/or the like) may selectively provide an alert message to an emergency point of contact for the user and/or to an emergency service based on whether the response to the notification is received from the user device within the threshold period of time, as described above in connection with FIGS. 1A-2. In some implementations, the alert message is to be provided when the response is not received from the user device. In some implementations, the alert message is not to be provided when the response is received from the user device.

Process 600 may include additional implementations, such as any single implementation or any combination of implementations described below and/or described with regard to any other process described herein.

In some implementations, the verification platform may process information identifying the reason for utilizing the abort transaction mechanism, with a machine learning model, to determine whether the reason is a first reason or a second reason, may determine whether to perform a first action or a second action based on whether the reason is the first reason or the second reason, where the first action is different from the second action, and may selectively perform the first action or the second action.

In some implementations, information identifying the reason for utilizing the abort transaction mechanism includes information indicating that the user aborted the transaction because the user felt unsafe, or information indicating that the user aborted the transaction because the user was in a hurry. In some implementations, the verification platform may cause the transaction device to release a transaction card associated with the user based on the selection of the abort transaction mechanism.

In some implementations, the verification platform may cause the transaction device to retain or destroy a transaction card associated with the user based on the selection of the abort transaction mechanism. In some implementations, the verification platform may cause a camera, located at a location of the transaction device, to capture images and/or video of the location based on the selection of the abort transaction mechanism, and may predict the reason for utilizing the abort transaction mechanism based on the images and/or the video of the location.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device and from a transaction device, transaction data associated with a transaction of a user logged into the transaction device,
the transaction data including information indicating a selection of an abort transaction mechanism that, when selected a single time, causes the transaction to be canceled and the user to be logged out of the transaction device;
receiving, by the device, the information indicating the selection of the abort transaction mechanism from the transaction device to cause the transaction to be canceled concurrently with the user being logged out of the transaction device;
transmitting, by the device, to a user device associated with the user, and based on receiving the information indicating the selection of the abort transaction mechanism, a request for response data from the user device;
determining, by the device, whether the response data is received from the user device within a threshold period of time,
the response data including information identifying a reason for utilizing the abort transaction mechanism, and
wherein determining whether the response data is received from the user device within the threshold period of time comprises:
determining whether any response data is received within the threshold period of time based on starting a timer associated with the threshold period of time;
training, by the device, a machine learning model based on historical data indicating that historical users aborted transactions associated with safety reasons;
processing, by the device and upon determining whether the response data is received from the user device within the threshold period of time, the information identifying the reason for utilizing the abort transaction mechanism, with the machine learning model, to determine one or more actions to perform; and
performing, by the device, the one or more actions.

2. The method of claim 1, wherein performing the one or more actions comprises:
transmitting an alert message to an emergency point of contact for the user and/or to an emergency service when it is determined that the response data is not received from the user device within the threshold period of time.

3. The method of claim 1, wherein the machine learning model includes a pattern recognition model that generates predictions for the one or more actions to perform based on the information identifying the reason for utilizing the abort transaction mechanism.

4. The method of claim 1, further comprising:
training the machine learning model with historical abort transaction data.

5. The method of claim 1, further comprising:
receiving camera data from a camera associated with a location of the transaction device; and
predicting the reason for utilizing the abort transaction mechanism based on the camera data.

6. A device, comprising:
one or more memories; and
one or more processors communicatively coupled to the one or more memories, configured to:
receive, from a transaction device, transaction data associated with a transaction of a user logged into the transaction device,
the transaction data including information indicating a selection of an abort transaction mechanism that, when selected a single time, causes the transaction to be canceled and the user to be logged out of the transaction device;
receive the information indicating the selection of the abort transaction mechanism from the transaction device to cause the transaction to be canceled concurrently with the user being logged out of the transaction device;
transmit to a user device associated with the user, and based on receiving the information indicating the selection of the abort transaction mechanism, a request for response data from the user device;
determine whether the response data is received from the user device within a threshold period of time,
the response data including information identifying a reason for utilizing the abort transaction mechanism, and
wherein the one or more processors, to determine whether the response data is received from the user device within the threshold period of time, are configured to:
determine whether any response data is received within the threshold period of time based on starting a timer associated with the threshold period of time;
train a model based on historical data indicating that historical users aborted transactions associated with safety reasons; and
selectively provide, based on using the model, an alert message to an emergency point of contact for the user and/or to an emergency service based on whether the response data is received from the user device within the threshold period of time,
wherein the alert message is to be provided when the response data is not received from the user device within the threshold period of time, or
wherein the alert message is not to be provided when the response data is received from the user device within the threshold period of time or when camera data indicates that the user is safe.

7. The device of claim 6, wherein the one or more processors are further to:
process information identifying the reason for utilizing the abort transaction mechanism and information identifying reasons for utilizing the abort transaction mechanism by other users of the transaction device, with a machine learning model, to determine one or more actions to perform; and
perform the one or more actions.

8. The device of claim 7, wherein the machine learning model includes a pattern recognition model that generates predictions for the one or more actions to perform based on the information identifying the reason for utilizing the abort transaction mechanism.

9. The device of claim 7, wherein the one or more processors, when performing the one or more actions, are to one or more of:
send a request to a security guard to move to a location of the transaction device.

10. The device of claim 6, wherein information identifying the reason for utilizing the abort transaction mechanism includes one of:
  information indicating that the user aborted the transaction because the user felt unsafe, or
  information indicating that the user aborted the transaction because the user was in a hurry.

11. The device of claim 6, wherein the abort transaction mechanism is displayed as a button or a key on a keypad.

12. The device of claim 6, wherein the one or more processors are further configured to:
  receive camera data from a camera associated with a location of the transaction device; and
  predict the reason for utilizing the abort transaction mechanism based on the camera data.

13. A non-transitory computer-readable medium storing instructions, the instructions comprising:
  one or more instructions that, when executed by one or more processors, cause the one or more processors to:
    receive, from a transaction device, transaction data associated with a transaction of a user logged into the transaction device,
      the transaction data including information indicating a selection of an abort transaction mechanism that, when selected, enables the user to cancel the transaction and log out of the transaction device at a same time;
    receive the information indicating the selection of the abort transaction mechanism from the transaction device to cause the transaction to be canceled concurrently with the user being logged out of the transaction device;
    provide, to a user device associated with the user and based on receiving the information indicating the selection of the abort transaction mechanism, a notification indicating that the transaction was canceled and that the user was logged out of the transaction device;
    determine whether a response to the notification is received from the user device within a threshold period of time,
      the response indicating that the notification was received by the user and indicating a reason for utilizing the abort transaction mechanism, and
      wherein the one or more instructions, that cause the one or more processors to determine whether the response is received from the user device within the threshold period of time, cause the one or more processors to:
        determine whether any response is received within the threshold period of time based on starting a timer associated with the threshold period of time;
    train a model based on historical data indicating that historical users aborted transactions associated with safety reasons; and
    selectively provide, based on using the model, an alert message to an emergency point of contact for the user and/or to an emergency service based on whether the response to the notification is received from the user device within the threshold period of time,
      the alert message is to be provided when the response is not received from the user device, or
      the alert message is not to be provided when the response is received from the user device.

14. The non-transitory computer-readable medium of claim 13, wherein the notification is provided via one or more of:
  an application,
  a short message service (SMS) or text message,
  an instant message,
  an email, or
  a telephone call.

15. The non-transitory computer-readable medium of claim 13, wherein the instructions further comprise:
  one or more instructions that, when executed by the one or more processors, cause the one or more processors to:
    process information identifying the reason for utilizing the abort transaction mechanism, with a machine learning model, to determine whether the reason is a first reason or a second reason;
    determine whether to perform a first action or a second action based on whether the reason is the first reason or the second reason,
      wherein the first action is different from the second action; and
    selectively perform the first action or the second action.

16. The non-transitory computer-readable medium of claim 13, wherein a single tap of the abort transaction mechanism indicates that a transaction card associated with the transaction is to be returned and a double tap of the abort transaction mechanism indicates that transaction card is to be retained or destroyed.

17. The non-transitory computer-readable medium of claim 13, wherein the one or more instructions, when executed by the one or more processors, further cause the one or more processors to:
  receive camera data from a camera associated with a location of the transaction device; and
  predict the reason for utilizing the abort transaction mechanism based on the camera data.

18. The method of claim 1, wherein the one or more actions include:
  requesting information identifying an emergency point of contact.

19. The method of claim 1, wherein the one or more actions includes:
  requesting further information about an aborted transaction from the user.

20. The non-transitory computer-readable medium of claim 13, wherein the one or more instructions further cause the one or more processors to retrain the model.

* * * * *